(12) United States Patent
Kim

(10) Patent No.: US 6,388,776 B1
(45) Date of Patent: May 14, 2002

(54) POWER CONTROL APPARATUS OF SCANNING DEVICE AND METHOD THEREOF

(75) Inventor: Hae-Chul Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/198,401

(22) Filed: Nov. 24, 1998

(30) Foreign Application Priority Data

Nov. 24, 1997 (KR) .............................................. 97-62288

(51) Int. Cl.$^7$ ................................................. H04N 1/04
(52) U.S. Cl. ........................................ 358/475; 382/218
(58) Field of Search ................................. 358/475, 474, 358/471, 307, 198, 421, 422; 382/218, 312, 313

(56) References Cited

U.S. PATENT DOCUMENTS 6,034,790 A * 3/2000 Kamei .......................... 358/474

* cited by examiner

Primary Examiner—Jerome Grant, II
Assistant Examiner—Negussie Worku
(74) Attorney, Agent, or Firm—Robert E. Bushnell, Esq.

(57) ABSTRACT

A device and a method for using a temperature detector to detect heat generated from the lamp of a scanning device to prevent the operation of a scanner while the scanner is overheating. Thus, effectively preventing the degradation of a scanner due to the overheating of the lamp in the scanning device of a multi-function peripheral. In addition, when the lamp becomes overheated, a safety margin can be maintained even when the central processing unit is not operating properly, because the power of the lamp gets cut off compulsorily through hardware rather than software that is necessarily dependent on the central processing unit.

20 Claims, 7 Drawing Sheets

POWER CONTROL APPARATUS OF SCANNING DEVICE AND METHOD THEREOF

CLAIM OF PRIORITY

This application makes reference to, incorporates the same herein, and claims all rights accruing thereto under 35 U.S.C. §119 through my patent application entitled Power Control Apparatus of scanning Device and Method Thereof earlier filed in the Korean Industrial Property Office on Nov. 24, 1997 and there duly assigned Ser. No. 1997/62288.

BACKGROUND OF THE INVENTION

FIELD OF THE INVENTION

The present invention relates to a multi-function peripheral and, more specifically, to a device and a method for controlling the power supplied to a scanning device in a scanner.

Today, a wide variety of office equipment is necessary to efficiently run an office. However, the cost of the many machines needed can be prohibitively expensive. This has led to many attempts to find ways of making office equipment more affordable. One such attempt has been the development of machines that are suitable for both printing and scanning. One method of making such multi-functional machines is to combine both a printing cartridge and a scanning module into one unit, a multi-functional cartridge.

A multi-function peripheral device can be attached to a computer system to increase the functionality of the computer system without increasing the amount of space required by peripherals as much as the use of separate peripheral, each designed for only one task, would require. In a multi-functional peripheral device, a central processing unit controls all of the systems and may be built into the peripheral or contained in the computer system. The central processing unit controls a system memory that contains a program for driving all the systems of the peripheral device. An image processor performs the functions of shading, gamma correction, dots per inch conversion, edge emphasis, and error diffusion etc. Image data is scanned by a scanner module, under the control of the central processing unit. A modem can send out signals that contain facsimiles of image data, and an port, also called an ECP port, can transfer signals between a personal computer, central processor, and a printer. A scanner module, that may be attached to a toner cartridge, scans images that are contained on a piece of paper. A rasterizer rasterizes image data that is read by the scanner module and arranged into vertical blocks. An image memory is a buffer memory that is used during the processing of the image data as needed by the image processor. A system memory is composed of a electrically programmable read only memory that is equipped with a program, or a set of BIOS instructions, for all systems of the peripheral device. A synchronized read only memory may be integrated with either the peripheral or the computer system to aid in the processing of data by the peripheral. A printer driver controls the print head of the printer and modulates the jetting of ink to form images.

I have observed, however, that some multi-functional peripherals can overheat due the heat generated by the lamp used in the scanning component of the peripheral. The contemporary art has used programs contained in the central processing unit to turn of the lamp of the scanning device when the system is overheating. This approach, however, only works when the central processing unit is functioning properly. Thus, when the central processing unit is malfunctioning, it is possible for the scanning device to dangerously overheat. As such, I believe that it may be possible to improve on the contemporary art by providing a method and a device for terminating the power to a lamp of a scanning device when an overheating condition exists using hardware.

SUMMARY OF THE INVENTION

Accordingly, it is an object of the present invention to provide an improved method and an improved device for terminating the power to a lamp of a scanning device when an overheating condition exists.

It is another object to provide a method and a device for terminating the power to a lamp of a scanning device that is operable even when the central processing unit is malfunctioning.

It is still another object to provide a method and a device for terminating the power to a lamp of a scanning device that uses hardware rather than software.

It is yet another object to provide a method and a device for terminating the power to a lamp of a scanning device that can terminate two different levels of power at the same time.

It is still yet another object to provide a method and a device for terminating the power to a lamp of a scanning device that is economical and easy to integrate into the manufacturing of either one of a multi-functional peripheral device or a stand-alone scanning device.

To achieve these and other objects, a device is provided that uses a temperature detector to detect heat generated from the lamp and output a corresponding voltage. A lamp power control apparatus controls the power being supplied to the lamp by checking the corresponding voltage against a reference voltage. Depending on the comparison of the two voltages a circuit deactivates the power supplied to the lamp.

A method of integrating the above device with a peripheral device starts with detecting a temperature of an area proximate to the lamp. Then, a lamp-temperature-voltage that is inversely proportional to the detected temperature is generated. This lamp-temperature-voltage is converted into an output-voltage by comparing the lamp-temperature-voltage with a reference-voltage. Then, an output voltage is sent out that has a low state while the lamp-temperature-voltage is below the reference-voltage. The power controller then terminates the power supply to the lamp while the output-voltage is in a low state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE DRAWINGS

Figure 1:
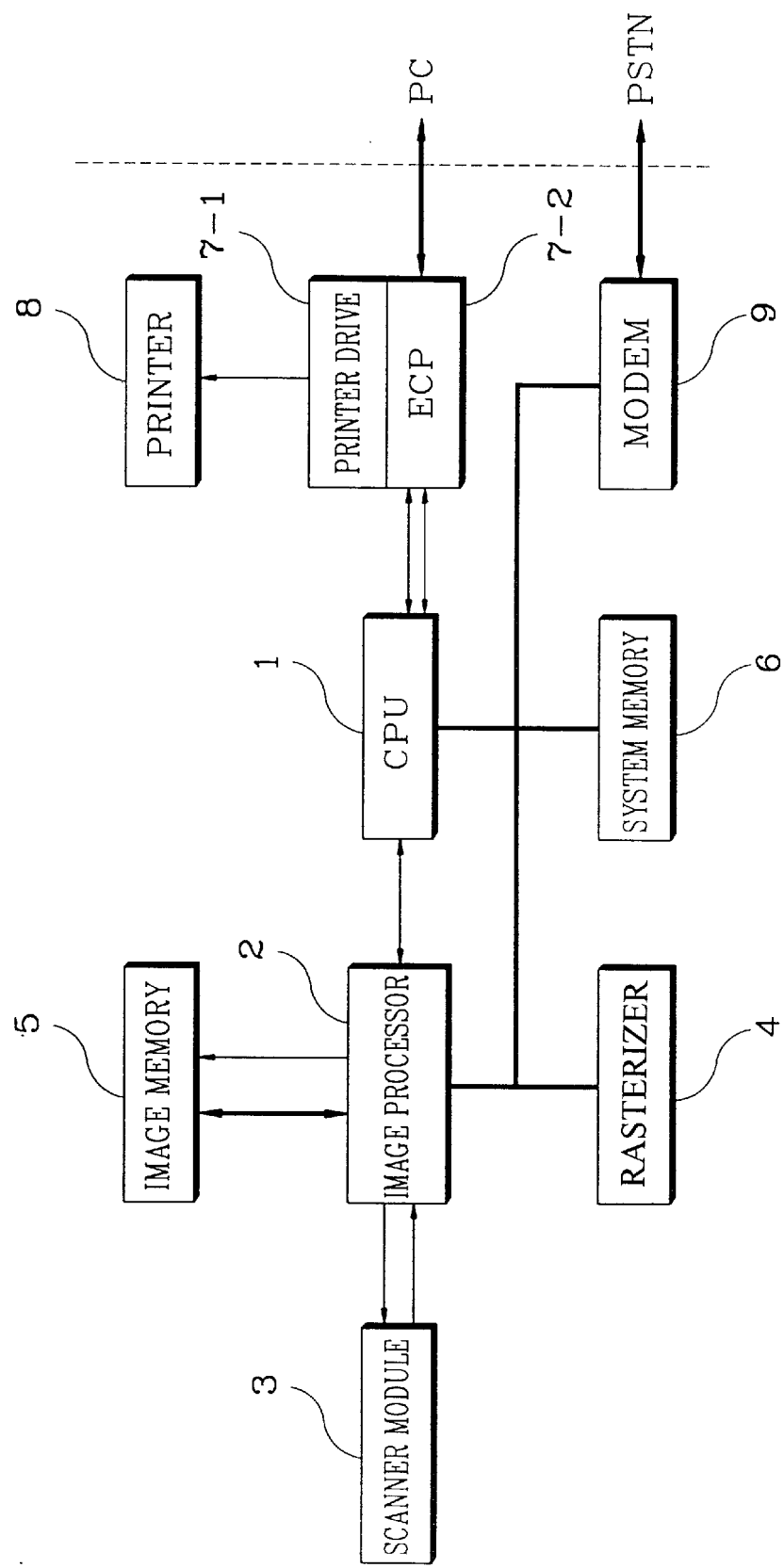
FIG. 1 is a block diagram illustrating a multi-function peripheral.

Turning now to the drawings, FIG. 1 illustrates a multi-function peripheral device that can be attached to a computer system. Central processing unit 1 controls all of the systems and may be built into the peripheral or contained in the computer system. The central processing unit controls system memory 6 that contains a program for driving all the systems of the peripheral device. Image processor 2 performs the functions of shading, gamma correction, dots per inch conversion, edge emphasis, and error diffusion etc. Image data is scanned by scanner module 3, under the control of central processing unit 1. Modem 9 can send out signals that contain facsimiles of image data, and port, also called ECP port, 7-1 can transfer signals between a personal computer, central processor 1, and printer 8. Scanner module 3, that maybe attached to a toner cartridge, scans images that are contained on a piece of paper. Rasterizer 4 rasterizes image data that is read by scanner module 3 and arranged into vertical blocks. Image memory 5 is a buffer memory that is used during the processing of the image data as needed by image processor 2. System memory 6 is composed of a electrically programmable read only memory that is equipped with a program, or a set of BIOS instructions, for all systems of the peripheral device. A synchronized read only memory may be integrated with either the peripheral or the computer system to aid in the processing of data by the peripheral. Printer driver 7-2 controls the print head of the printer and modulates the jetting of ink to form images.

Figure 2:
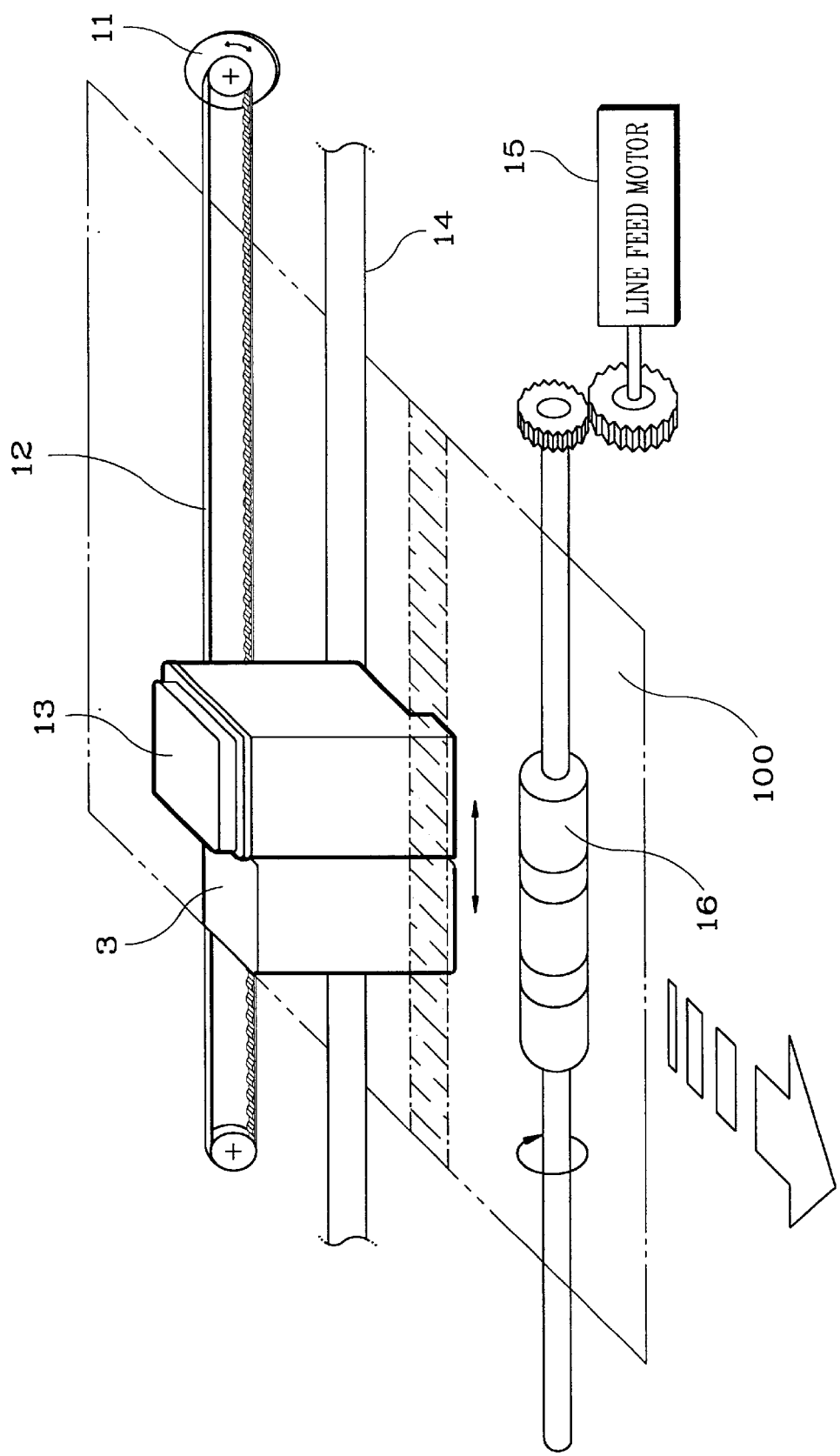
FIG. 2 is a perspective view of a multi-functional peripheral.

The system similar to FIG. 1 can be partially illustrated as shown in FIG. 2. Scanner module 3 and ink cartridge module 13 move along the same horizontal shaft 14 and are driven by moving belt 12, that is controlled by carriage return motor 11. Manuscript 100 is fed into the peripheral and discharged by line feed roller, or system of rollers, 16 that rotate according to the driving of line feed motor 15.

Figure 3:
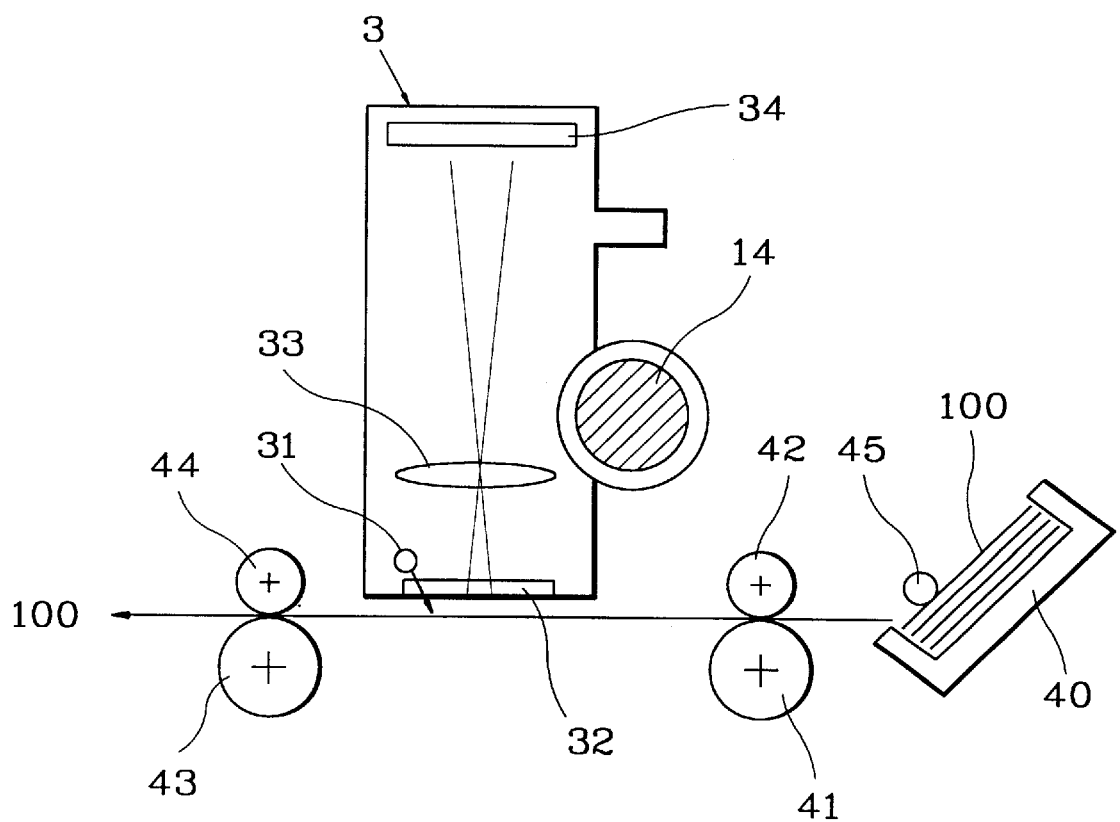
FIG. 3 is an illustration of a scanner module.

FIG. 3 is a side view illustrating a scanning device used in a scanning process for a multi-function peripheral. A multi-function peripheral can be designed with an inkjet head module that is attached and driven by the same components driving the scanning unit. Scanner module 3 and ink cartridge module 13 are bound together by a carriage (not shown) that is attached to belt 12. The carriage motor generates a rectilinear reciprocating motion in the carriage that transports both the scanning device and the ink jet cartridge along a surface of manuscript 100. Thus, an image can be scanned, or read, and further images can be printed. Manuscript 100 is held in paper cassette 40 and then fed into drive roller 41 and friction roller 42 by feeding roller 45. The paper, or manuscript, is then discharged by the rotational force of a discharging roller and star wheel 44 after the scanning process is finished. A printing function is performed by propelling ink from the inkjet head of cartridge module 13 onto manuscript 100 while scanner module 3 and cartridge module 13 move from side to side over the paper. A scanning function is performed using lamp 31, that is contained in scanning device 3, that irradiates light onto manuscript 100 while scanner device 3 and cartridge module 13 move in a rectilinear reciprocating fashion.

Figure 4A:
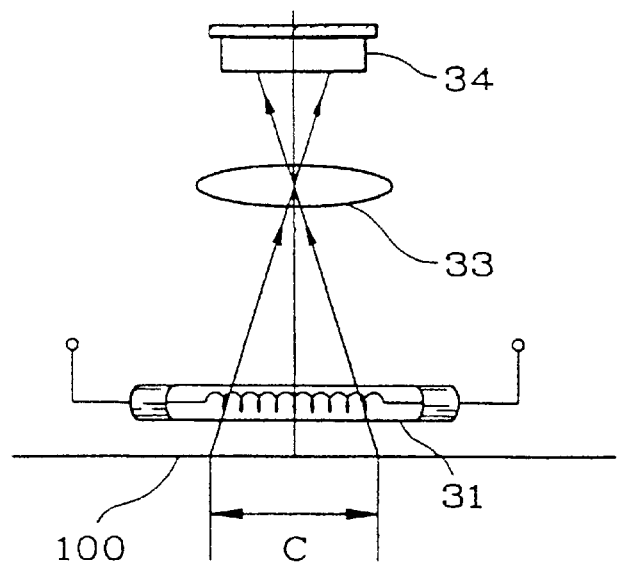
FIG. 4a is a second illustration of a scanner device.
Figure 4B:
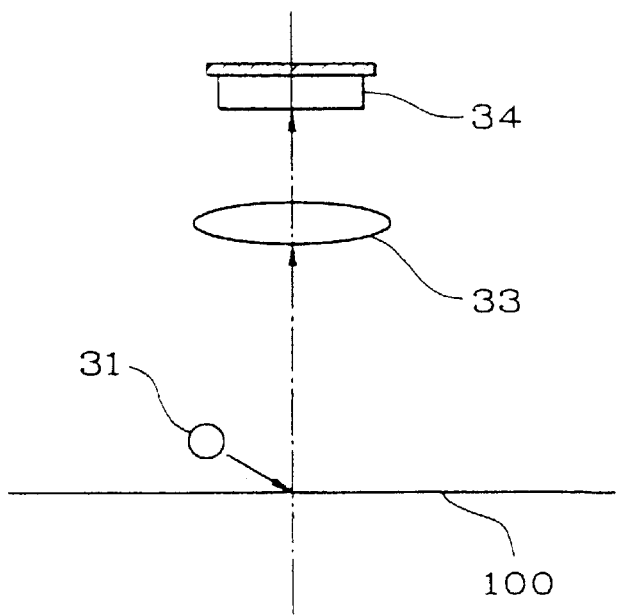
FIG. 4b is a third illustration of a scanner device.
Figure 5:
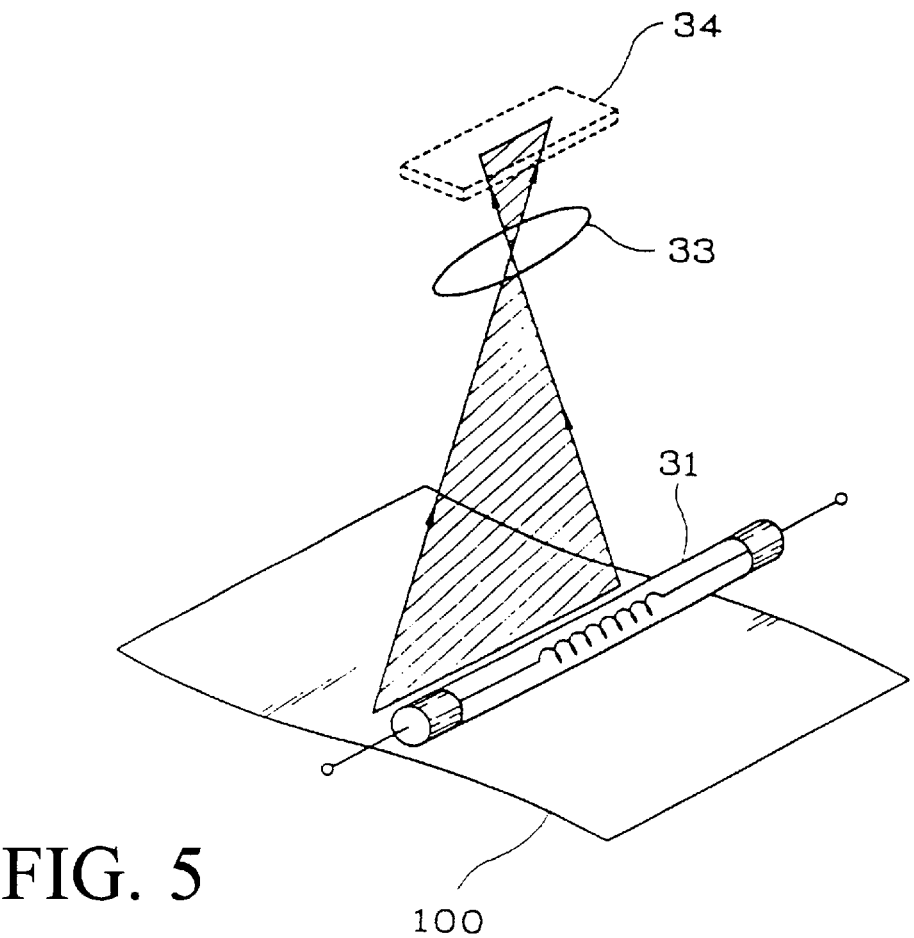
FIG. 5 is a perspective view of a scanning device.

The design of the scanner module is detailed in both FIGS. 4a and 4b. FIG. 4a is a cross-sectional view of an optical image reading system and FIG. 4b is a side view of an optical image reading, or scanning, system. The optical image forming system may be constructed using lamp 31 to transmit light onto a surface of manuscript 100. Lens 33 focuses the reflected light, that is generated from lamp 31, onto charge coupled device 34. Charge coupled device 34 recognizes an image by converting light into a voltage, i.e. converting light energy into electrical energy. Charge coupled device 34 is a sensor that converts light energy into a voltage that can then be interpreted by other components of the system. A peripheral operational view of a scanning device is shown in FIG. 5. Image data is interpreted according to the quantity of light that is reflected from the irradiated surface of manuscript 100. This light is transmitted through lens 33 and focused on the sensing surface of charge coupled device sensor 34.

Figure 6:
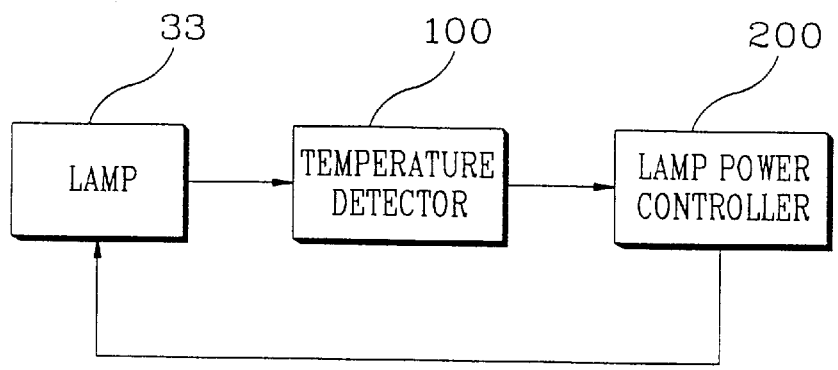
FIG. 6 is a block diagram of a protection circuit as constructed according to the principles of the present invention.

FIG. 6 is a block diagram illustrating a lamp protection circuit as constructed according to the principles of the present invention. The protection circuit may be constructed using temperature detector 100 that is capable of sensing the temperature change caused by the scanning lamp. Lamp power control apparatus 200 controls the power being supplied to the lamp according to the detecting result of temperature detector 100.

Figure 7:
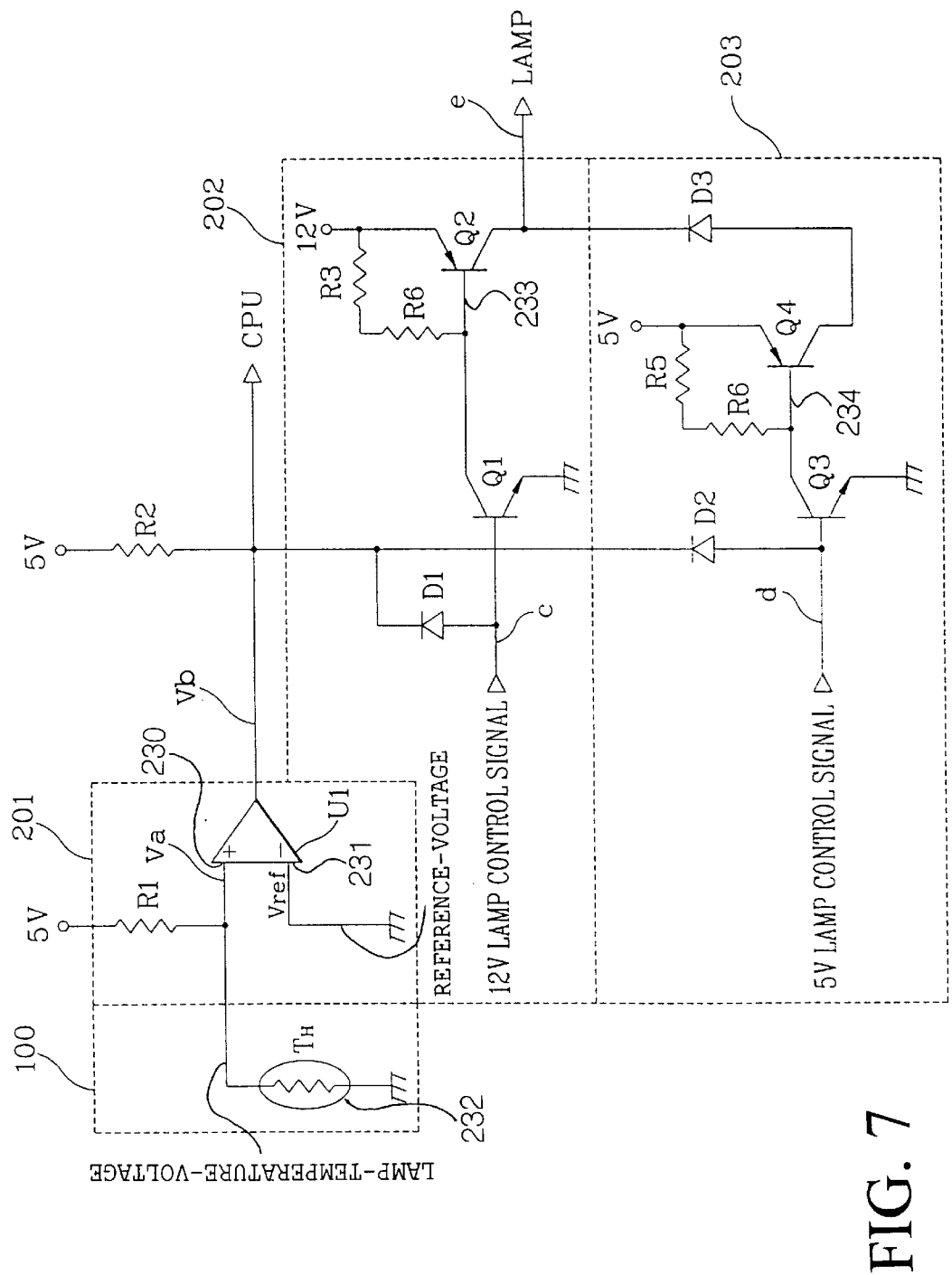
FIG. 7 is a detailed circuit diagram illustrating the protection circuit of FIG. 6.

FIG. 7 illustrates one example of a circuit that can be used to regulate the power supplied to a lamp of a scanning device. Dotted lines divide the circuit into major components. A lamp power control component 200 may be constructed using temperature comparer 201 to output an output-voltage that is generating by analyzing the difference between a lamp-temperature-voltage generated by temperature detector, or thermistor, 100 with a reference-voltage. Switching components 202 and 203 illustrate circuits that are used to convert control signals into different levels of power supply for the lamp. Both of the switching components use transistors to enable the switches to be turned off when an output-voltage is in a low state. This causes both of the signals to the lamp to be cut off and the power to the lamp to be terminated.

Temperature comparing part 201 may be constructed using operational amplifier U1, that receives the lamp-temperature-voltage at non-inversion terminal 230 and receives a comparison voltage, or reference-voltage at inversion terminal 231. Switching components 202 and 203 may be comprised using a number of transistors, denoted Q1 through Q4, that modulate the control signals depending on an output-voltage from temperature comparer 201.

Temperature detector 100 may be constructed using thermistor 232. Other electrical devices that are capable of converting temperature change into a voltage can also be used. The thermistor is an element having a resistance that varies according to changes in temperature and, as such, the thermistor should be installed near the lamp in the scanning device.

As the temperature of the lamp rises, the lamp-temperature-voltage generated by the thermistor decreases gradually. When the lamp-temperature-voltage becomes lower than the reference-voltage, the output-voltage of the temperature comparer is inverted and enters a low state. This causes any signals that are being sent through either 12 V switch 202 or 5 V switch 203 to be routed through diodes D1 or D2, thus turning off both of the switches and terminating power to the lamp. When signals are shorted across diodes D1 and D2, transistors Q1 and Q3 are turned off, and the power of the lamp becomes cut off. When the transistor Q1 is turned off, a driving voltage is not formed at base terminal 233 and at the emitter terminal of the transistor Q2 and the 12 V power supply to the lamp is cut off Similarly, the 5 V power supply to the lamp is cut off, while the output of the comparator is in a low state. When transistor Q3 is turned off, a driving voltage is not formed on base terminal 234 and the emitter terminal of transistor Q4. Thus, the 5 V power supply to the lamp that is supplied through the collector terminal and diode D3 is terminated.

The scanning lamp is supplied with either a power supply of 12 V or 5 V depending on the function being performed by the scanning device. The 12 V power supply is active while an actual scanning operation is being performed. The SV power supply is active while a non-scanning operation is being performed, such as moving the scanning device back to one side of a sheet of paper when scanning is only being performed in one direction or while advancing the scanning device one step while preparing to scan another line. The 5 V power supply is used for preheating prior to actually performing image scanning. The maintenance of a power supply to the lamp during non scanning operations is important because the error rate of the scanning device is reduced when the lamp maintains a predetermined temperature.

Scanning can generally be performed using either one-way, or single direction, scanning or using a two-way, orbi-directional, scanning. When single direction scanning is being used, 12 V is supplied during the actual scanning of the document, and 5 V is supplied while returning the scanning device to the home position. When bi-directional scanning is being performed, 12 V is supplied to the scanning lamp while the scanning device is moving in both the forward scanning direction and while the scanning device is moving in the reverse scanning direction, and 5 V is only supplied while increasing or reducing the speed of a stepping motor that is used to advance the scanning device by one step along the document. The chart below details what has been explained above.

| Lamp_12V | Lamp_5V | thermistor output | comparison result | lamp operation |
|---|---|---|---|---|
| H | L | a > $V_{REF}$ | H | 12V ON |
| L | H | a > $V_{REF}$ | H | 5V ON |
| X | X | a < $V_{REF}$ | L | OFF |

In summary, the chart basically details that if the 12 V control signal, denoted Lamp_12 V, is on and the output-voltage is not in a low-state, that the lamp is operated at 12 V. When the 5 V control signal, denoted Lamp_5 V, is on and the output-voltage is not in a low-state, the lamp is operated at 5 V. When the lamp-temperature-voltage is lower than the reference-voltage, the output-voltage enters a low state and the lamp is unconditionally disconnected from any power supply. Thus, when the lamp gets overheated the protection circuit cuts off the power supply regardless of proper operation of the central processing unit.

Figure 8:
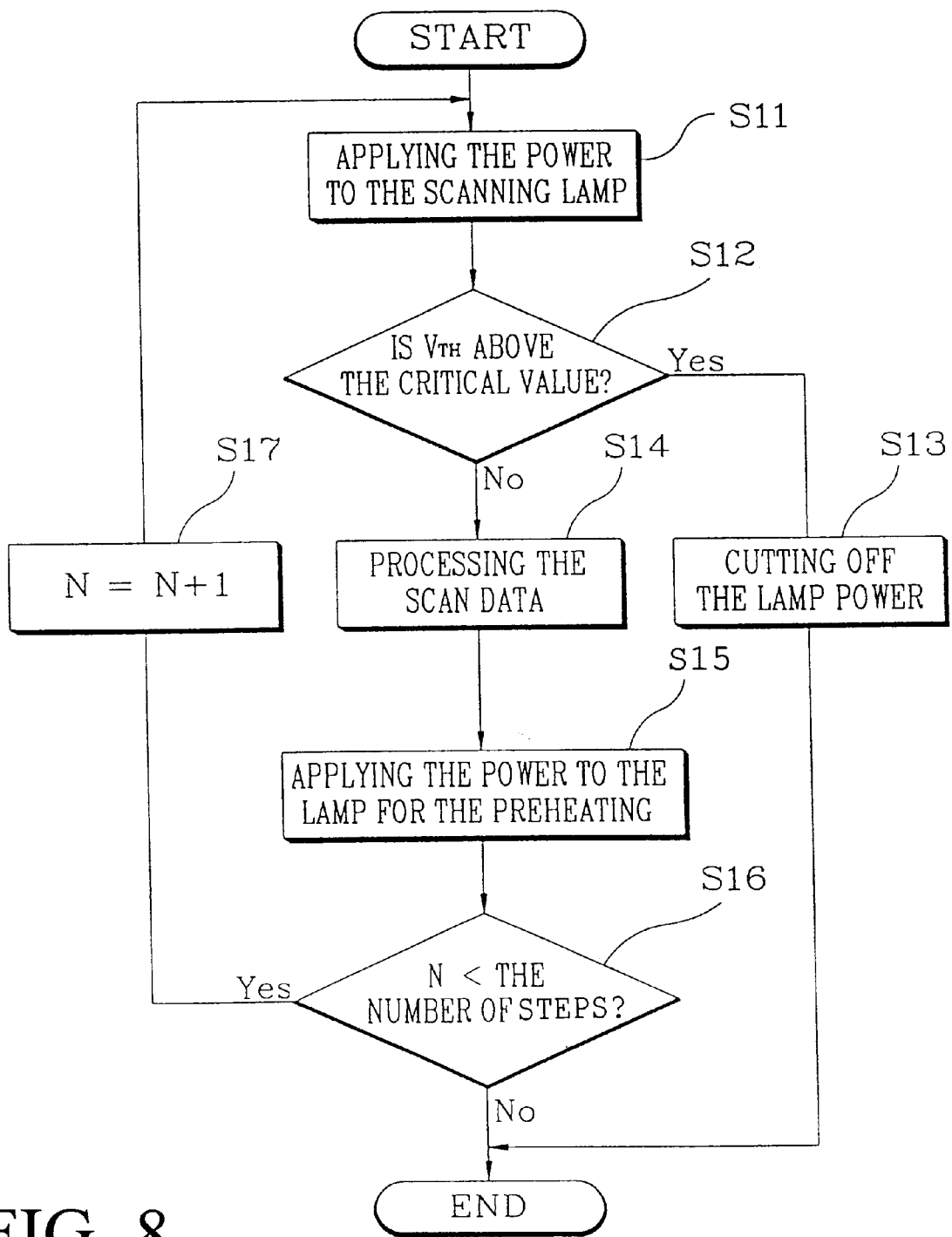
FIG. 8 is a flow chart diagram illustrating a method of controlling the power supply of a lamp used in a scanning device according to the principles of the present invention.

FIG. 8 is a flow chart illustrating a method of controlling the power supplied to a lamp of a scanning device according to the principles of the present invention. In step S11, a 12 V power supply is supplied to the lamp to perform a scanning operation. Then, during step S12, lamp-temperature-voltage that is output by the thermistor, or temperature detecting device, is compared with the reference-voltage. Then, in step S13, the power supplied to the lamp is cut off while the lamp-temperature-voltage is below the reference-voltage. During step S14, if the lamp temperature is within operational norms, scan data is obtained. Then, in step S15, a power supply of 5 V is supplied to the lamp while either increasing or reducing the speed of the stepping motor or changing the scan direction to maintain a predetermined temperature in the lamp. During step S16 it is determined whether the scanning operation is complete and if there is more document to be scanned the scanning device is advanced one step during step S17.

As described above, the present invention can effectively prevent the degradation of a scanner due to the overheating of the lamp in the scanning device of a multi-function peripheral. In addition, when the lamp becomes overheated, a safety margin can be maintained even when the central processing unit is not operating properly, because the power of the lamp gets cut off compulsorily through the hardware.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A scanner, comprising:
    a body enclosing a means for reading an image from a sheet of paper;
    a scanning device slidably attached inside said body that moves in a reciprocating fashion while reading said image, said scanning device having a lamp;
    a central processing unit;
    a power supplier attached to said body and providing and terminating a power supply to said lamp in said scanning device in response to said central processing unit;
    a temperature detector contained in said body and outputting a first signal representing a temperature detected near said lamp;
    a comparator electrically connected to said temperature detector and outputting a second signal after comparing said first signal with a reference signal;
    said central processing unit connected to said comparator, controlling said power supplier to supply and terminate said power supply to said lamp in response to said second signal; and
    a power controller electrically connected to both said comparator and said power supplier, terminating said power supply to said lamp in response to said second signal regardless of said control processing unit controlling said power supplier to supply said power supply to said lamp.

2. The scanner of claim 1, further comprised of said power controller supplying a normal-amount-of-power to said lamp when said scanning device is performing actual scanning and supplying a lower-amount-of-power that is lower than said normal-amount-of-power when said scanning device is not performing actual scanning in response to said central processing unit.

3. The scanner of claim 2, with said power controller further comprising a plurality of transistors that are used to supply said power supply to said lamp, said plurality of transistors having a plurality of activation-signals that are shorted through diodes when said second signal is in a low state, thus causing said power supply to said lamp to be terminated.

4. The scanner of claim 3, with said plurality of transistors forming two CMOS transistors that control said power supply to said lamp.

5. The scanner of claim 4, further comprised of said normal-amount-of-power being 12 volts.

6. The scanner of claim 5, further comprised of said lower-amount-of-power being 5 volts.

7. The scanner of claim 1, with said power controller prohibiting said power supplier to provide said power supply to said lamp in response to said output signal regardless of said central processing unit.

8. The scanner of claim 1, with said power controller allowing said power supplier to provide said power supply to said lamp in response to central processing unit when said comparator outputs a second output signal representing that said temperature is not greater than a predetermined value.

9. The scanner of claim 1, wherein said output signal represents that said temperature is greater than a predetermined value.

10. A method of controlling a power supplier for a scanning device, comprising the steps of:

providing a central processing unit controlling said power supplier to provide and terminate a power supply to a lamp contained in said scanning device;

detecting a temperature proximate to a lamp caused by a plurality of heat generated from said lamp of said scanning device;

generating a first signal representing said temperature;

comparing said first signal with a reference signal;

outputting a second signal representing that said first signal is greater than a predetermined value; and terminating said power supply to said lamp in response to said second signal regardless of the control of said central processing unit.

11. The method of claim 10, further comprised of the step of allowing said power supplier to supply a normal-amount-of-power to said lamp when said scanning device is performing actual scanning and to supply a lower-amount-of-power that is lower than said normal-amount-of-power when said scanning device is not performing actual scanning when said first signal is not greater than said predetermined value.

12. The method of claim 10, further comprised of the step of allowing said power supplier to supply said power supply to said lamp in response to controlling of said central processing unit when said first signal is not greater than said predetermined value.

13. The method of claim 10, wherein said power supplier controlled by said central processing unit is prevented to supply said power supply to said lamp in response to said second signal.

14. A scanner, comprising:

a body enclosing a means for reading an image from a sheet of paper;

a scanning device slidably attached inside said body that moves in a reciprocating fashion while reading said image, said scanning device having a lamp;

a central processing unit;

a power supplier connected to said lamp, providing and terminating a power supply to said lamp in said scanning device, in response to the control of said central processing unit;

a detector disposed adjacent to said lamp to output a first signal representing a temperature of said lamp;

a comparator electrically connected to said detector and outputting a second signal after comparing said first signal with a reference;

a power controller electrically connected to both said comparator and said power supplier, preventing said power supplier from supplying said power supply to said lamp in response to said second signal regardless of the control of said central processing unit.

15. The scanner of claim 14, with said power controller further comprising:

a plurality of transistors that are used to supply said power supply to said lamp, said plurality of transistors having a plurality of activation-signals that are shorted through diodes when said output-voltage is in said low state, thus causing said power supply to said lamp to be terminated.

16. The scanner of claim 14, wherein said second signal represents that said temperature of said lamp is greater than a predetermined value.

17. The scanner of claim 14, further comprising:

said comparator outputting a third signal after said first signal representing said temperature of said lamp has been compared with said reference; and said power controller allowing said power supplier to supply said power supply to said lamp in response to both said third signal of said comparator and said control of said central processing unit.

18. The scanner of claim 14, wherein said third signal represents that said temperature of said lamp is not greater than a predetermined value.

19. The scanner of claim 14, with said power controller allowing said power supplier to supply a first amount of power and a second amount of power to said lamp in response to said central processing unit when said second signal is not output to said power controller.

20. The scanner of claim 14, with said power controller terminating said power supply to said lamp in response to said second signal regardless of the control of said central processing unit.

* * * * *